Sept. 30, 1930. J. M. MANN 1,777,099
TRANSMISSION
Filed June 18, 1928 2 Sheets-Sheet 1
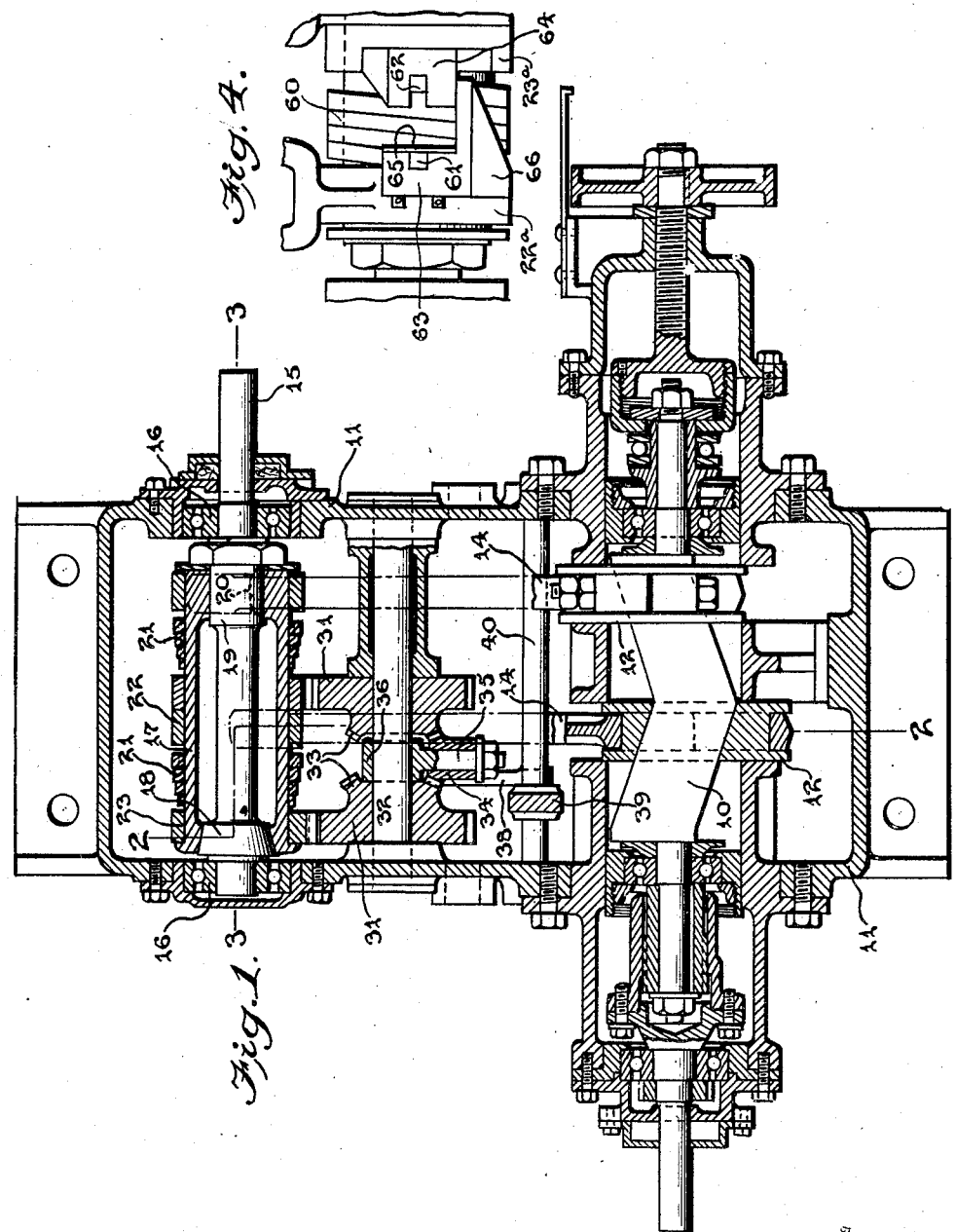
Inventor
John M. Mann,
By
Attorney Sept. 30, 1930.   J. M. MANN   1,777,099
TRANSMISSION
Filed June 18, 1928   2 Sheets-Sheet 2
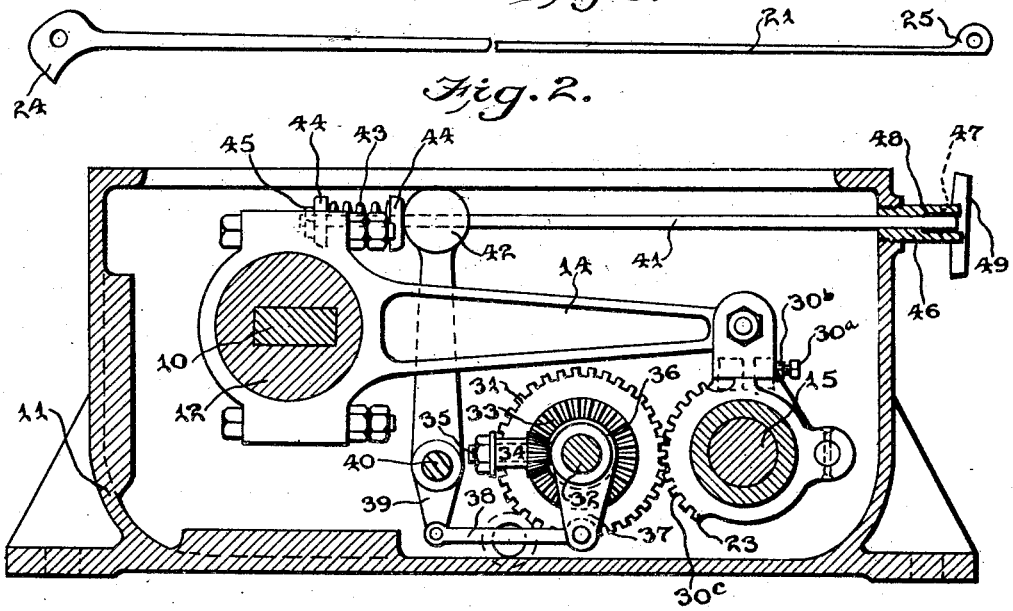
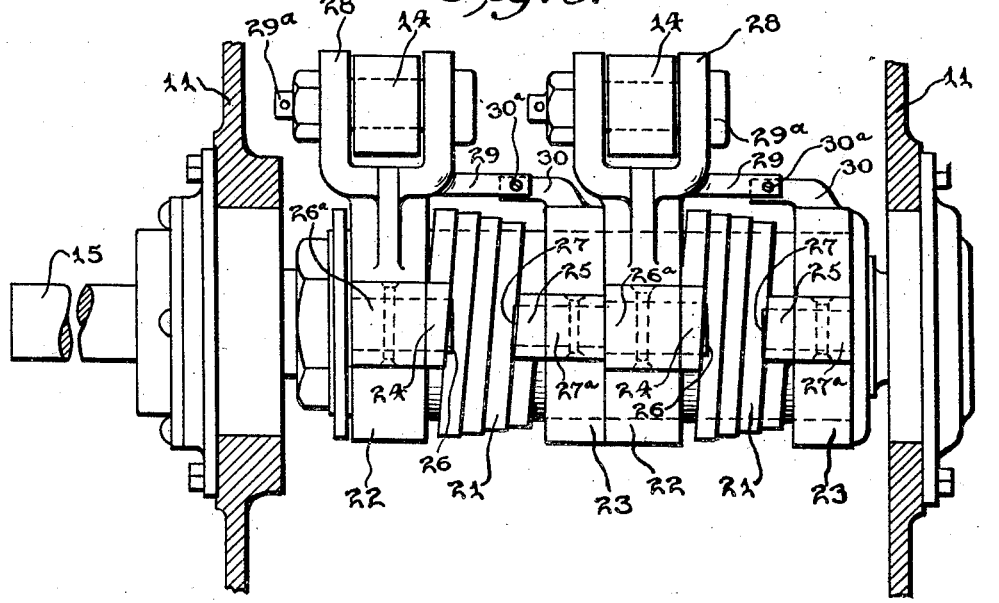
Inventor
John M. Mann,
By
Attorney Patented Sept. 30, 1930

1,777,099

UNITED STATES PATENT OFFICE

JOHN M. MANN, OF PHILADELPHIA, PENNSYLVANIA

TRANSMISSION

Application filed June 18, 1928. Serial No. 286,229.

The object of the invention is to provide a mechanism to serve as a connecting link between the prime-mover and load, as between the motor and propeller shaft of an auto vehicle, but particularly as an industrial unit to serve to connect machines to their driving motors, so that a wide variation of speed for the load may be had at a high efficiency and without the necessity for making any speed variations in the driving motor; to provide a transmission for use with industrial machines where they are arranged for group operation, as where one motor operates a group of several, so that each machine may be stopped or started at will without interference with others and readily regulated as to speed to suit the requirements of the particular work in hand; to provide a transmission in which the likelihood of damage to the operative parts is reduced to a minimum and of such form that replacements may be readily made should damage occur; to provide a transmission in which rotary motion of the driver is translated into reciprocating motion and retranslated into rotary motion of the driven; to provide a transmission in which the driven comprises a plurality of clutches successively operated in such a way, in the retranslation of the reciprocating motion, that a uniform rotary motion of the driven may be had; and to provide a transmission in which the clutch elements are interconnected to automatically effect a balance between them and provided with means to render them selectively active or inactive without regard to the movement of the driver.

With this object in view the invention consists in a construction and combination of parts of which a preferred embodiment is illustrated in the accompanying drawings, wherein:

Figure 1 is a horizontal sectional view of a transmission constructed in accordance with the invention.

Figures 2 and 3 are sectional views on the planes indicated by lines 2—2 and 3—3 respectively of Figure 1.

Figure 4 is an elevational view of a modified form of clutch.

Figure 5 is an edge elevational view showing the gripper prior to being wound into its spiral form.

The driver 10 is in the form of an axially adjustable crank shaft journaled in appropriate bearings in the side walls of the casing or housing 11 and carries the eccentrics 12, the degree of eccentricity of which is varied by said axial adjustment. The driver is adapted for coupling to a driving motor and the rotary motion of the latter is, by reason of the eccentrics, translated into reciprocating motion of the connecting rods 14 which are connected one each to a clutch element of which there are several on the driven.

In the illustrated embodiment, the driver is shown with two eccentrics angularly spaced at one hundred and eighty degrees but obviously the number may be increased and the crank shaft so formed to reduce the spacing between eccentrics—that is the angular spacing—in accordance with the number employed. The increase in the number of eccentrics in the driver calls for a corresponding increase in the number of clutch elements in the driven to the novelty in which the present specification is particularly directed. The driven comprises a shaft 15 paralleling the crank shaft 10 and journaled in ball bearings 16 mounted in opposite side walls of the casing or housing 11. Within the casing, the shaft supports a drum 17 which at one end seats on a conical enlargement 18 of the shaft 15 and at the other end engages a cylindrical enlargement 19 of the shaft, to which cylindrical enlargement it is keyed as indicated at 20. One extremity of the shaft 15 protrudes beyond the casing or housing for connection to the load to be driven. The projecting end of the shaft 15 is preferably on the opposite side of the casing or housing from that end of the drive shaft designed for connection to the driving motor.

The clutches with which the connecting rods 14 are operatively connected are in the form of circumferentially contractile grippers 21 made preferably from cross-sectionally angular stock wound in spirals for disposition in surrounding relation to the drum. The stock from which the spiral grippers is formed is of longitudinally tapering form so that each convolution forms a ring slightly thinner than the next preceding. Each gripper is disposed between the units of a pair of complemental collars 22 and 23 loosely mounted on the drum and its extremities are formed into terminal eyes 24 and 25 engaged with pins 26 and 27 carried by enlargements 26$^a$ and 27$^a$ formed on the collars 22 and 23 respectively. The collar 22 is formed with a fork 28 straddling the extremity of the connecting rod 14 and a pivotal connection is effected between the two by means of a wrist pin 29$^a$. This construction provides for an oscillating movement being imparted to the collar 22. When the connecting rod is reciprocated, if the gripper be contracted on the drum during one oscillation and released during the next, the drum and with it the driven shaft will be moved a specified angular distance. Where there are a plurality of grippers and these actuated in succession, the result is a continuous rotary movement of the drum in one direction. The collar 22 is formed with a lateral arm or extension 29 and the collar 23 with a cooperating lateral arm or extension 30 overlapping the arm 29, an adjusting screw 30$^a$ being carried by the latter and bearing upon the former and having its setting maintained by a lock nut 30$^b$. Since the terminals of the gripper are connected to the two collars respectively, the overlapping arms 29 and 30 and adjusting screw 30$^a$ act as means for limiting the circumferential expansion of the gripper, and the adjusting screw may be set to permit the gripper to expand just enough to ensure its moving freely on the drum.

The collar 23 diametrically opposite the enlargement 27$^a$ is formed with a toothed sector 30$^c$ with which is in mesh a spur gear 31 rotatably mounted on a shaft 32 paralleling the shaft 15 and secured in the opposite side walls of the casing or housing 11. Each collar 23 has its cooperating gear 31, and adjacent gears 31 are operatively connected to function as a balancing or differential gear mechanism, being formed on facing sides with integral bevel gears 33 in mesh with a bevel pinion 34 mounted for rotation on a stud 35 projecting radially from a collar 36 loosely mounted on the shaft 32 between the gears 33. The collar is designed to be rocked slightly on the shaft 32 and to this end is provided with a pendent arm 37 with the extremity of which a link 38 pivotally connects, the link in turn being pivotally connected to the lower end of the lever 39 rockingly mounted on a shaft 40 spanning the casing. An actuating rod 41 extends through an eye formed in the head 42 at the upper end of the lever 39 and surrounding the protruding extremity of the actuating rod is a compression spring 43 the extremities of which engage cupped washers 44 bearing respectively against the head 42 and a nut 45 mounted on the extremity of the rod. The remote terminal of the actuating rod is disposed exterior to the casing, extending through a tubular guide member 46 which is slotted axially from the outer end as indicated at 47 and 48, the latter slot being deeper than the former and displaced an angular distance of ninety degrees. A transverse handle member 49 is connected with the exteriorly exposed extremity of the actuating rod and may be seated either in the slot 47 or the slot 48, the handle and with it the rod 41 being turned to effect either the one or the other seating of the handle and determining the position of the pinion 34 with respect to the shaft 32. This mechanism just described and consisting of the collar 36, actuating rod 41 and interconnecting parts constitutes the means by which the driven is rendered active or inert while the driver is moving.

In the operation of the mechanism, the driven will remain at rest despite the rotation of the driver if the clutches, consisting of the spiral grippers and their attendant collars be so positioned that contraction into gripping engagement with the drum will not be effected prior to the completion of the strokes of the connecting rod. Since the grippers are spirally formed contracting members, the strokes of the connecting rods in one direction will tend to expand them and in the other direction to contract them and it is only in the direction of movement effecting contraction that motion will be imparted to the drum 17. But movement of the drum can be prevented even with the connecting rods moving in the direction to effect contracting of the grippers, if the anchor points on the latter (which are the pins 27) be so positioned with respect to the drum that complete contraction of the grippers is not effected until the conclusion of the contracting strokes of the connecting rods. The means for shifting the anchor points consists of the balance or differential gear mechanism and the means for rocking or shifting the pinion element of the same. When the handle 49 is engaged in the slot 47, the lever 39 will be rocked right-handedly as viewed in Figure 2 with the result that the collar 36 will be turned right-handedly, tending to raise the axis of the pinion 34 and therefore rotating the spur gears 31 right-handedly and rocking the collars 23 left-handedly, thus swinging the anchor points 27 of the grippers a slight distance around the drum in a left-handed direction. Thus the stroke right-handedly of the connecting rods will impart angular or rotary movement of the drum during practically the full interval of the right-hand stroke. During the left-hand strokes of the connecting rods, the tendency is to effect circumferential expansion of the grippers but this is never more than sufficient to release the grippers from the drum since the screws 30ª will, after a specified expansion of the grippers engage the arms 30 and thereby rotate the collars 23 in unison with the collars 22. Since the connecting rods, however, are angularly displaced these operations on the clutches will not occur at the same time but at regular intervals one after the other. Thus on the left-hand stroke of one connecting rod when the one gripper is moving backward or through the inoperative cycle, its collar 23 moving in unison with its attendant collar 22 will react through the balance gear mechanism on the collar 23 of the adjacent clutch to position the anchor point of the gripper of that, so that contraction of that gripper into binding engagement on the drum is promptly effected by the connecting rod which is then moving in the proper direction to effect such contraction.

When the handle 49 of the actuating rod 41 is seated in the slot 48, the lever 39 is permitted to swing left-handedly and thus the stud 35 and with it the gear 34 will be swung left-handedly with the result that the spur gears 31 will be turned left-handedly, thus rocking the collars 23 right-handedly and shifting the anchor points of the grippers to positions where complete contraction of the same will not be had until the completion of the contracting strokes of the connecting rods. By reason of the balance or differential gear element, the tendency of the lever 39 is always to swing left-handedly and it is therefore only necessary to provide means for applying a pressure in a right-handed direction and this means consists of the actuating rod and its attendant parts by which it is connected to the lever and to the casing.

By forming the grippers with convolutions of progressively reduced thickness of stock and having the thinner ends anchored to the collars 23, a more uniform gripping of the drum is effected throughout the extent of the grippers, since the twisting or torsional strain on the same is distributed throughout and not confined to the initial convolutions, as is the case where the stock of the grippers is of uniform thickness, as in the modified form of gripper 60 shown in Figure 4. This latter form, however, is the cheaper and functions satisfactorily in very small units and differs from the preferred form by having its extremities 61 and 62 out-turned and seated in slots in enlargements 63 and 64 of the collars 22ª and 23ª respectively. A keeper plate 65 secured to the enlargements 63 in spanning relation to the slot serves to retain the out-turned terminal 61 therein. In this form, the means limiting the circumferential expansion of the gripper consists in an extension 66 of the enlargement 63, this extension overlapping the enlargement 64.

The speed of the driven is varied by changing the stroke of the connecting rods, and this, as before stated, is done by axial adjustment of the driving shaft which obviously effects a change in the degree of eccentricity of the eccentrics.

The invention having been described what is claimed as new and useful is:

1. A transmission comprising driving and driven members, clutches carried by the driven member, reciprocating connections between driving member and said clutches, means to effect clutching action of the clutches in one direction of movement of said reciprocating connections and release in the other direction of movement of the same, and a differential gear mechanism interconnecting adjacent clutches.

2. A transmission comprising driving and driven members, clutches carried by the driven member, reciprocating connections between driving member and said clutches, means to effect clutching action of the clutches in one direction of movement of said reciprocating connections and release in the other direction of movement of the same, and means for effecting bodily movement of the clutches with respect to the driven member so that clutching action may be selectively obtained or prevented during the operation of said reciprocating connections, said means embodying a differential gear mechanism for equalizing the operation of said clutches.

3. A transmission comprising driving and driven members, clutches carried by the driven member, reciprocating operative connections between the driving member and said clutches, each clutch embodying a circumferentially contractile gripper, collars with which the extremities of the grippers are connected, one of the collars of each clutch being engaged with one of the reciprocating connections from the driving member, and a differential gear connected to and angularly shifting the other collars.

4. A transmission comprising driving and driven members, clutches carried by the driven member, reciprocating operative connections between the driving member and said clutches, each clutch embodying a circumferentially contractile gripper, collars with which the extremities of the grippers are connected, one of the collars of each clutch being engaged with one of the reciprocating connections from the driving member, and means for angularly shifting the other collars, said last named means comprising a differential gear operatively connecting the corresponding collars of all of the clutches.

5. A transmission comprising driving and driven members, a plurality of clutches carried by the driven member, each clutch embodying a pair of collars loosely mounted on the driven member, and a circumferentially contractile gripper surrounding the driven member and terminally connected with the collars, a reciprocating operative connection between one of each pair of the collars and the driving member, a toothed sector carried by the other collar of each pair, a gear meshing with each said sector, a pinion operatively connecting the gears of adjacent collars to provide for differential movement of the same, and means for effecting bodily movement of the pinion angularly about the axis of said gears as a center.

6. A transmission comprising driving and driven members of which the latter is provided with a drum, clutches mounted on said drum of which each clutch embodies a pair of collars loosely engaging the drum and a circumferentially contractile gripper with its extremities connected one to each of the collars, reciprocating connecting rods connecting the driving member with one of the collars of each clutch, and a balancing gear mechanism connected with the remaining collars of the clutches.

7. A transmission comprising driving and driven members of which the latter is provided with a drum, clutches mounted on said drum of which each clutch embodies a pair of collars loosely engaging the drum and a circumferentially contractile gripper with its extremities connected one to each of the collars, reciprocating connecting rods connecting the driving member with one of the collars of each clutch, and a balancing gear mechanism connected with the remaining collars of the clutches, said balancing gear mechanism being provided with actuating means to effect its bodily rotation and the consequent rotation of the connected collars on the drum.

In testimony whereof he affixes signature.

JOHN M. MANN.